(12) United States Patent
Lota

(10) Patent No.: US 7,708,247 B2
(45) Date of Patent: May 4, 2010

(54) REMOVABLE CONSOLE CUPHOLDER ADAPTOR

(75) Inventor: Charan Singh Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 14 days.

(21) Appl. No.: 11/970,556

(22) Filed: Jan. 8, 2008

(65) Prior Publication Data

US 2009/0173862 A1    Jul. 9, 2009

(51) Int. Cl.
*A47K 1/08*    (2006.01)
(52) U.S. Cl. .................... 248/311.2; 224/926
(58) Field of Classification Search .............. 248/311.2; 224/926, 283; 220/737
See application file for complete search history.

(56) References Cited

U.S. PATENT DOCUMENTS 4,721,216 A  *  1/1988  Kinder ...................... 215/393
D407,951 S  *  4/1999  Philipson et al. .......... D7/619.1
6,315,153 B1  *  11/2001  Osborn ........................ 220/737
6,641,102 B2  *  11/2003  Veltri et al. ............... 248/311.2
2005/0258325 A1  *  11/2005  Morrison ................. 248/311.2

FOREIGN PATENT DOCUMENTS

JP    1020050017728    2/2005

\* cited by examiner

*Primary Examiner*—Ramon O Ramirez
(74) *Attorney, Agent, or Firm*—Gifford, Krass, Sprinkle, Anderson & Citkowski, P.C.

(57) ABSTRACT

A removable cup adaptor is for holding a beverage container for use in a cup holder that eliminates rattling of the beverage container when both the cup adaptor and beverage container are seated in a cup holder. The removable cup adaptor has a plurality of ribs extending radially outward from the outer surface. The removable cup adaptor eliminates rattle of the beverage containers by having the ribs maintaining contact with an inner surface of the vehicle console cup holder. The ribs are made of a flexible material such as rubber, such that the removable cup adaptor may be fittingly seated into cup holders of different diameters, but rigid enough such that the ribs provide stability while the removable adaptor is seated therein.

4 Claims, 2 Drawing Sheets

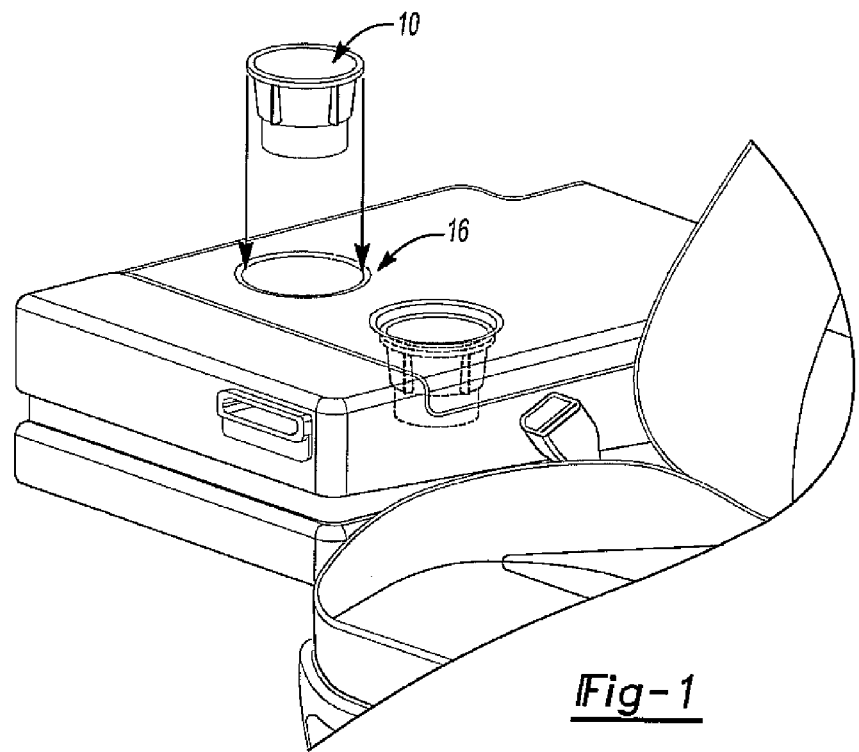
Fig-1
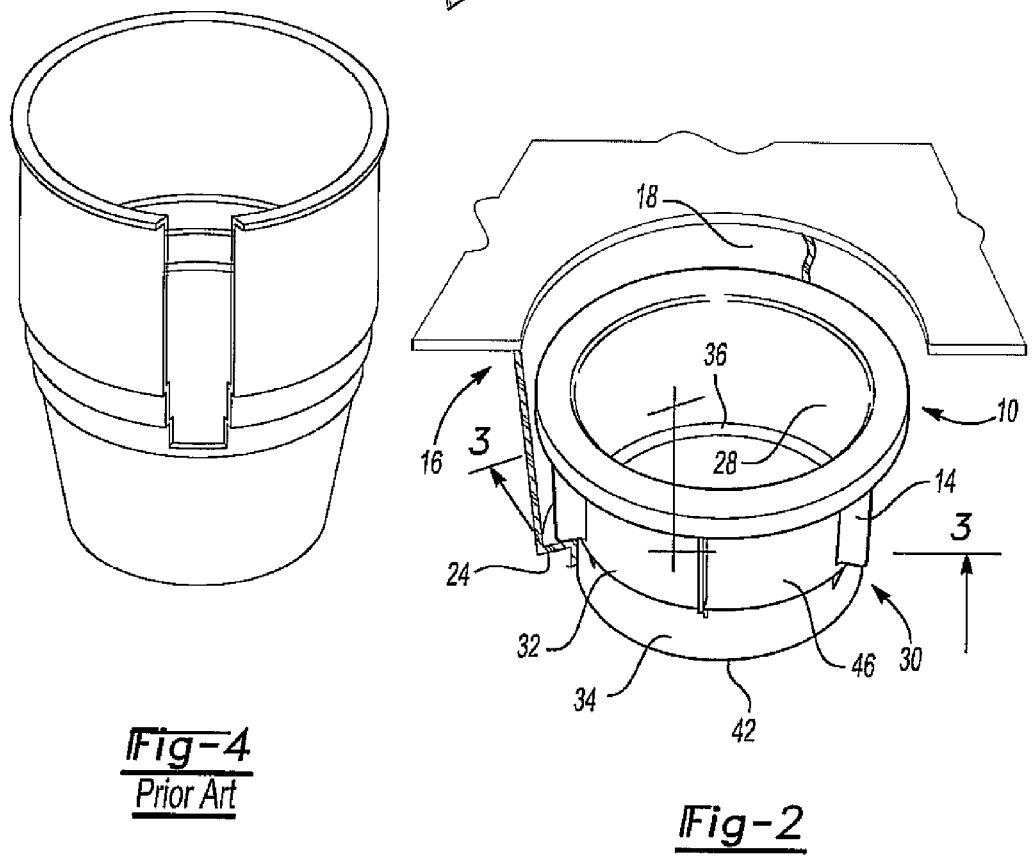
Fig-4
Prior Art
Fig-2

REMOVABLE CONSOLE CUPHOLDER ADAPTOR

FIELD OF THE INVENTION

The invention relates to a removable cup adaptor. Specifically, a removable cup adaptor that eliminates rattling of a beverage container seated therein having a first opening to receive beverage containers of varying sizes for use in a vehicle console cup holder.

BACKGROUND OF THE INVENTION

Many vehicle consoles have molded cup holder with two portions for holding beverage containers of different sizes, a narrow portion and a wide portion. The narrow portion is disposed beneath the wide portion, and extends thereto. The narrow portion is narrower than the wide portion, thus the cup holder is able to seat beverage containers of different sizes. However, beverage containers come in many different sizes and shapes and may not fit within the vehicle console cup holder. For instance, coffee mugs may not seat properly within the console cup holder because of the handle. Accordingly, removable cup adaptors have been used to accommodate such beverage containers. However, existing removable cup adaptors tend to rattle when inserted and used with a beverage container because the adaptors do not fit securely within the cup holder.

One such removable adaptor is illustrated in U.S. Pat. No. 5,088,673 to Chandler. The '673 patent discloses a removable adaptor having a bottom portion extending to an upper portion, the bottom portion being narrower than the upper portion. The bottom portion is perfectly solid in order to weigh the adaptor down, and the upper portion is hollow in order to receive a beverage container. The upper portion has a vertically extending slot, for receipt of a cup handle. The lower portion is seated into a cup holder in order to secure a beverage container that does not fit in the cup holder, and provides stability to the beverage container by weighing the beverage container down via the lower portion. However, the '673 patent will not prevent the beverage from rattling within the cup holder when the cup holder is not of a diameter which fittingly receives the removable cup adaptor. Nor does the '673 patent fittingly accommodate beverage containers of two different diameters. Thus, it is desirable to have a removable cup holder adaptor that can maintain contact with a plurality of different sized cup holders, while still fittingly holding beverage containers of two different diameters.

SUMMARY OF THE PRESENT INVENTION

According to one aspect of the invention, a removable cup adaptor is provided for holding a beverage container for use in a cup holder that eliminates rattling of the beverage container when both the cup adaptor and beverage container are seated in a cup holder. The removable cup adaptor has a receptacle member which is further divided into an upper portion, and a lower portion, with an annular surface disposed therein between. The removable adaptor cup fittingly holds beverage containers having diameters corresponding to the diameters of the upper portion or the lower portion of the receptacle member. The receptacle member is hollow and has a plurality of ribs extending radially outward from the outer surface of the receptacle member. The removable cup adaptor eliminates rattling of the beverage container by having the plurality of ribs maintain contact with an inner wall of the vehicle console cup holder. The removable cup adaptor is made of a flexible material such as rubber, such that the removable cup adaptor may be fittingly seated into cup holders of different diameters, but rigid enough such that the plurality of ribs provide stability while the removable adaptor is seated therein.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a perspective of the present invention used in a cup holder of a vehicle console, wherein the present invention is shown disposed above and within a cup holder;

FIG. 2 is a view of a fragmented cup holder with the present invention seated therein;

FIG. 4 is a perspective of a conventional cup adaptor.

DETAILED DESCRIPTION OF THE INVENTION

Figure 3:
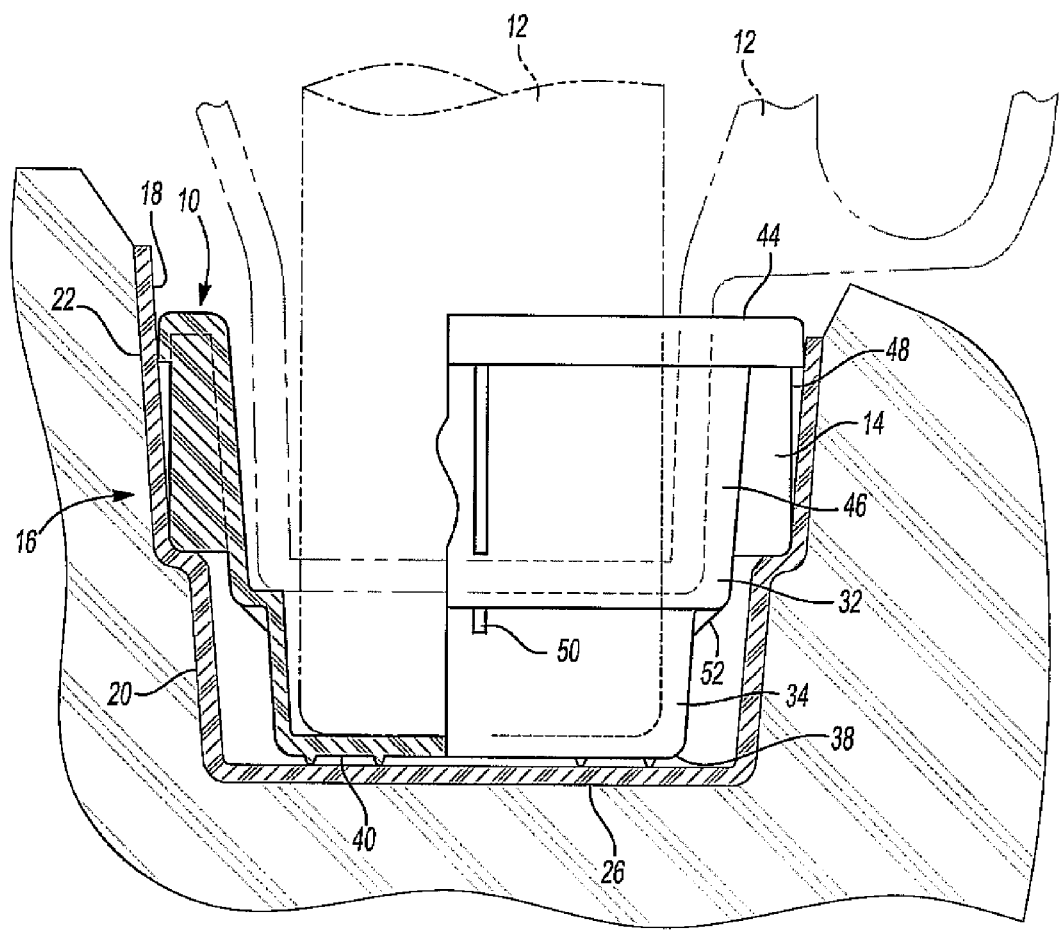
FIG. 3 is a cross-sectional view of the present invention seated within the cup holder, the present invention containing beverage containers having different diameters.

With reference first to FIG. 1, a preferred embodiment of a removable cup adaptor 10 according to the present invention is illustrated. The removable cup adaptor 10 is used to hold a beverage container 12 and has ribs 14 extending from the outer surface 46 to prevent rattle when the removable cup adaptor 10 holding the beverage container 12 is inserted in a cup holder 16 of a vehicle console. The removable cup adaptor 10 has a predetermined diameter. The cup holder 16 has an inner surface 18 with a predetermined inner diameter. The predetermined inner diameter of the cup holder 16 is greater than the predetermined diameter of the cup adaptor 10 and therefore the cup adaptor 10 is able to fittingly receive the beverage container 12.

For illustrative purposes, the cup holder 16 has a narrow portion 20 extending to a wide portion 22 via an inner ledge 24, and a floor 26. The narrow portion 20 is smaller in diameter than the wide portion 22. The removable cup adaptor 10 is shown being used in a vehicle console having two cup holders 16. The removable cup adaptor 10 is shown seated within one cup holder 16, and positioned above the second cup holder 16. FIG. 3 shows the cup holder 16 having a tapered profile from the opening 28 to the floor 26; however, it is anticipated that the adaptor is suitable for cup holders 16 without such a taper.

FIGS. 1, 2, and 3 show a preferred embodiment the cup adaptor 10. The cup adaptor includes a plurality of ribs 14 extending radially outward from the outer surface 46 of the upper portion 32 of the cup adaptor 10. Each of the plurality of ribs 14 have a distal edge 48 that is spaced apart from the upper portion 32. The distal edge 48 is parallel to the upper portion 32, and extends from the flange 44 towards the annular surface 36. However it is anticipated that the ribs 14 can have a variety of shapes and sizes. In the preferred embodiment the ribs 14 extends from the distal edge 48 of each rib 14 and maintains contact with the inner surface 18 of the vehicle console cup holder 16 and thus eliminates rattling of beverage containers 12 seated therein. However, the ribs 14 may be disposed on the lower portion 34 of the cup adaptor 10 as well. In either embodiment, the ribs 14 extends outwardly from the outer surface 46 of the cup adaptor 10 with the distal edge 48 being generally parallel to the outer surface 46 such that contact with the inner surface 18 of the cup holder 16 is maintained.

FIGS. 1, 2, and 3 show a preferred embodiment the cup adaptor 10. The cup adaptor includes a plurality of ribs 14 extending radially outward from the outer surface 46 of the upper portion 32 of the cup adaptor 10. Each of the plurality of ribs 14 have a distal edge 48 that is spaced apart from the upper portion 32. The distal edge 48 is parallel to the upper portion 32, and extends from the flange 44 towards the annular surface 36. However it is anticipated that the ribs 14 can have a variety of shapes and sizes. In the preferred embodiment the ribs 14 extends from the distal edge 48 of each rib 14 and maintains contact with the inner surface 18 of the vehicle console cup holder 16 and thus eliminates rattling of beverage containers 12 seated therein. However, the ribs 14 may be disposed on the lower portion 34 of the cup adaptor 10 as well. In either embodiment, the ribs 14 extends outwardly from the outer surface 46 of the cup adaptor 10 with the distal edge 48 being generally parallel to the outer surface 46 such that contact with the inner surface 18 of the cup holder 16 is maintained FIG. 3 shows the distal edge 48 of a rib 14 in contact with the inner surface 18 of the cup holder 16. The outer surface 46 of the cup holder 16 is spaced apart from the inner surface 18 of the cup holder 16. The cup adaptor 10 is immobilized within the cup holder 16 by the contact between the distal edge 48 of the ribs 14 and the inner surface 18 of the cup holder 16. A portion of each rib 14 is seated within the step formed by the inner ledge 24 and the wide portion 22 of the cup holder 16. Accordingly, the plurality of ribs 14 not only abut against the inner surface 18 of the cup holder 16, but may also rest upon an inner ledge 24 of a cup holder 16.

The lower portion 34 has a plurality of support members 50 spaced equally apart, the support members 50 extend radially outward from the outer surface 46 of the lower portion 34. The support members 50 each have a support edge 52, and the support edge 52 extends vertically along the lower portion 34 from the annular surface 36 to the terminal free end 38 of the lower portion 34. The plurality of support members 50 provides support for the upper portion 32 of the removable cup adaptor 10.

Accordingly, the removable cup adaptor 10 is able to hold either a narrow beverage container 12 or a wide beverage container 12 without the removable cup adaptor 10 rattling within the vehicle console cup holder 16 while the vehicle is in motion. The removable adaptor achieves this by having the distal edge 48 of the ribs 14 maintain contact with an inner surface 18 of the vehicle console cup holder 16, and a portion of each rib 14 seated within a step of the cup holder 16. The cup adaptor 10 can also be modified such that the support members 50 abuts abut against an inner ledge 24 of the cup holder 16 while the ribs 14 maintain contact with the inner surface 18 of the cup holder 16. In either embodiment, the cup adaptor 10 allows users to enjoy beverages in containers of differing diameters without the containers raffling while the vehicle is in motion.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A removable cup adaptor configured to hold a beverage container and for insertion into a cup holder of a vehicle console, the cup holder having an inner surface, the removable cup adaptor comprising:
 a receptacle member configured to hold the beverage container, the receptacle member having an opening, an upper portion, a lower portion, an annular surface disposed between the upper portion and the lower portion, and an outer surface, and the opening is configured to receive the beverage container, the lower portion includes a plurality of support members and a terminal free end spaced apart and opposite the annular surface, each of the plurality of support members is spaced apart from the other and extends radially outward from the outer surface of the lower portion to the annular surface so as to support the upper portion of the receptacle member; and
 a plurality of ribs attached to the outer surface of the receptacle member, each of the plurality of ribs is spaced apart from the other and extends radially from the outer surface, to a distal edge, the distal edge spaced apart from the outer surface of the receptacle member, and each of the distal edges is configured to engage the inner surface of the cup holder so as to prevent the removable cup adaptor from rattling within the cup holder.

2. A removable cup adaptor as set forth in claim 1, further including a flange extending outwardly from the opening of the receptacle member.

3. A removable cup adaptor as set forth in claim 1, wherein the lower portion includes a second opening disposed at the terminal free end.

4. A removable cup adaptor as set forth in claim 1, wherein the lower portion includes a bottom surface, the bottom surface being a planar surface disposed at the terminal free end.

\* \* \* \* \*

UNITED STATES PATENT AND TRADEMARK OFFICE
CERTIFICATE OF CORRECTION

PATENT NO.       : 7,708,247 B2                                          Page 1 of 1
APPLICATION NO.  : 11/970556
DATED            : May 4, 2010
INVENTOR(S)      : Charan Singh Lota It is certified that error appears in the above-identified patent and that said Letters Patent is hereby corrected as shown below:

Column 4 line 5 replace "raffling" with --rattling--

Signed and Sealed this

Twenty-third Day of November, 2010

David J. Kappos
*Director of the United States Patent and Trademark Office*